(12) United States Patent
Lee

(10) Patent No.: US 10,575,325 B2
(45) Date of Patent: Feb. 25, 2020

(54) DEVICE AND METHOD OF HANDLING SERVICE IN UNLICENSED CELL

(71) Applicant: ACER INCORPORATED, New Taipei (TW)

(72) Inventor: Chien-Min Lee, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 90 days.

(21) Appl. No.: 14/874,468

(22) Filed: Oct. 4, 2015

(65) Prior Publication Data

US 2016/0105907 A1 Apr. 14, 2016

Related U.S. Application Data

(60) Provisional application No. 62/061,709, filed on Oct. 9, 2014.

(51) Int. Cl.
| | |
|---|---|
| *H04B 7/204* | (2006.01) |
| *H04W 72/12* | (2009.01) |
| *H04W 56/00* | (2009.01) |
| *H04L 1/18* | (2006.01) |
| *H04L 27/26* | (2006.01) |
| *H04W 16/14* | (2009.01) |
| *H04W 74/08* | (2009.01) |

(Continued)

(52) U.S. Cl.
CPC ....... *H04W 72/1294* (2013.01); *H04L 1/1822* (2013.01); *H04L 1/1861* (2013.01); *H04L 27/2601* (2013.01); *H04W 16/14* (2013.01); *H04W 56/0015* (2013.01); *H04W 72/1268* (2013.01); *H04L 5/0055* (2013.01); *H04W 72/0446* (2013.01); *H04W 74/0816* (2013.01)

(58) Field of Classification Search
CPC ............. H04W 72/1294; H04W 16/14; H04W 72/1268; H04W 56/0015; H04W 72/0446; H04W 74/0816; H04L 27/2601; H04L 1/1861; H04L 5/0055
USPC ........................................ 370/336, 335, 337
See application file for complete search history.

(56) References Cited

U.S. PATENT DOCUMENTS

| | | | | |
|---|---|---|---|---|
| 2013/0286959 | A1* | 10/2013 | Lou ........................ | H04W 72/04 370/329 |
| 2013/0343288 | A1* | 12/2013 | Ratasuk ............ | H04W 72/1215 370/329 |
| 2014/0112289 | A1 | 4/2014 | Kim | |

(Continued)

FOREIGN PATENT DOCUMENTS

WO 2014157923 A1 10/2014

OTHER PUBLICATIONS

U.S. Appl. No. 62/038,673, filed Aug. 18, 2014.*

(Continued)

*Primary Examiner* — Chuong T Ho
(74) *Attorney, Agent, or Firm* — Winston Hsu

(57) ABSTRACT

A communication device for receiving a service in an unlicensed cell comprises a storage unit for storing instructions and a processing means coupled to the storage unit. The processing means is configured to execute the instructions stored in the storage unit. The instructions comprise receiving information of a resource pool in the unlicensed cell from a network; detecting a first starting point of a first service in the resource pool; and receiving the first service according to the first starting point, after the first starting point is detected.

18 Claims, 15 Drawing Sheets

(51) Int. Cl.
*H04L 5/00* (2006.01)
*H04W 72/04* (2009.01)

(56) References Cited

U.S. PATENT DOCUMENTS

| | | | | |
|---|---|---|---|---|
| 2015/0049741 | A1* | 2/2015 | Chen | H04W 48/12 370/336 |
| 2015/0223243 | A1* | 8/2015 | Tabet | H04W 28/085 370/330 |
| 2015/0271846 | A1* | 9/2015 | Kowalski | H04W 72/14 370/329 |
| 2015/0351003 | A1* | 12/2015 | Ahn | H04B 7/2656 455/434 |
| 2016/0050667 | A1* | 2/2016 | Papasakellariou | H04W 74/0808 370/329 |
| 2016/0088607 | A1* | 3/2016 | Sorrentino | H04W 52/0229 370/329 |
| 2016/0088642 | A1* | 3/2016 | Yang | H04W 24/08 455/451 |
| 2016/0095024 | A1* | 3/2016 | Chae | H04W 72/042 370/280 |
| 2016/0095101 | A1* | 3/2016 | Ye | H04L 1/1812 370/329 |
| 2017/0118765 | A1* | 4/2017 | Kalhan | H04W 76/14 |
| 2017/0201985 | A1* | 7/2017 | Wang | H04B 7/15528 |
| 2017/0207815 | A1* | 7/2017 | Chae | H04L 5/00 |
| 2017/0208588 | A1* | 7/2017 | Park | H04L 27/26 |
| 2017/0215187 | A1* | 7/2017 | Panteleev | H04W 72/1278 |
| 2018/0175975 | A1* | 6/2018 | Um | H04L 1/1816 |

OTHER PUBLICATIONS

LG Electronics, Candidate solutions for LAA operation, 3GPP TSG RAN WG1 Meeting #78bis, Oct. 6-10, 2014, R1-144042, XP050869704, Ljubljana, Slovenia.

Ericsson, Initial discussion on solutions for identified LAA functionalities, 3GPP TSG RAN WG1 Meeting #78bis Ljubljana, Slovenia, Oct. 6-10, 2014, R1-144267, XP050869892.

IEEE Standard for Information technology—Telecommunications and information exchange between systems Local and metropolitan area networks—Specific requirements, Part 11: Wireless LAN Medium Access Control (MAC) and Physical Layer (PHY) Specifications, Mar. 29, 2012, IEEE Std 802.11TM-2012 (Revision of IEEE Std 802.11-2007), XP017694963, IEEE.

Ericsson, Initial discussion on identified functionalities for LAA, 3GPP TSG RAN WG1 Meeting#78bis, Oct. 6-10, 2014, R1-144266, XP050869891, Ljubljana, Slovenia.

* cited by examiner

DEVICE AND METHOD OF HANDLING SERVICE IN UNLICENSED CELL

CROSS REFERENCE TO RELATED APPLICATIONS

This application claims the benefit of U.S. Provisional Application No. 62/061,709, filed on Oct. 9, 2014 and incorporated herein by reference.

BACKGROUND OF THE INVENTION

1. Field of the Invention

The present invention relates to a communication device and a method used in a wireless communication system and related communication device, and more particularly, to a communication device and method of handling a service in an unlicensed cell in a wireless communication system.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) using LTE, etc. For a UE and an eNB to communicate with each other in the LTE-A system, the UE and the eNB must support standards developed for the LTE-A system, such as the 3GPP Rel-10 standard or later versions.

Network operators propose to offload network traffic of the LTE/LTE-A system to an unlicensed cell, to ease load of the network traffic. For example, the eNB may provide services to the UE via the unlicensed cell. However, resource in the unlicensed cell is not always available, and it is not easy for the eNB to allocate the resource in the unlicensed cell. The operations on the unlicensed cell are even more complicated, when the UE operates on both a licensed cell and the unlicensed cell (e.g., in the CA case). The resource scheduling for the licensed cell and the unlicensed cell is thus an important problem to be solved.

Correspondingly, hybrid automatic repeat request (HARQ) feedbacks should be transmitted in response to usage of the resource. It is still unknown how the HARQ feedbacks can be transmitted and received, when the UE operate on the licensed cell and the unlicensed cell. Thus, the transmission and reception of the HARQ feedback is also an important problem to be solved.

SUMMARY OF THE INVENTION

The present invention therefore provides a method and related communication device for handling a service in an unlicensed cell to solve the abovementioned problem.

A communication device for receiving a service in an unlicensed cell comprises a storage unit for storing instructions and a processing means coupled to the storage unit. The processing means is configured to execute the instructions stored in the storage unit. The instructions comprise receiving information of a resource pool in the unlicensed cell from a network; detecting a first starting point of a first service in the resource pool; and receiving the first service according to the first starting point, after the first starting point is detected.

A communication device for handling a data detection in an unlicensed cell comprises a storage unit for storing instructions and a processing means coupled to the storage unit. The processing means is configured to execute the instructions stored in the storage unit. The instructions comprise receiving information of a timing offset in a first subframe of a cell of the network; and detecting data received in a second subframe of an unlicensed cell of the network according to the first subframe and the timing offset, wherein the first subframe is later than the second subframe.

A communication device for handling a hybrid automatic repeat request (HARQ) feedback for an unlicensed cell comprises a storage unit for storing instructions and a processing means coupled to the storage unit. The processing means is configured to execute the instructions stored in the storage unit. The instructions comprise receiving a first transmission associated with a first HARQ process number in a first unlicensed cell from a network; and transmitting a first HARQ feedback associated with the first HARQ process number in response to the first transmission in a first licensed cell to the network.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
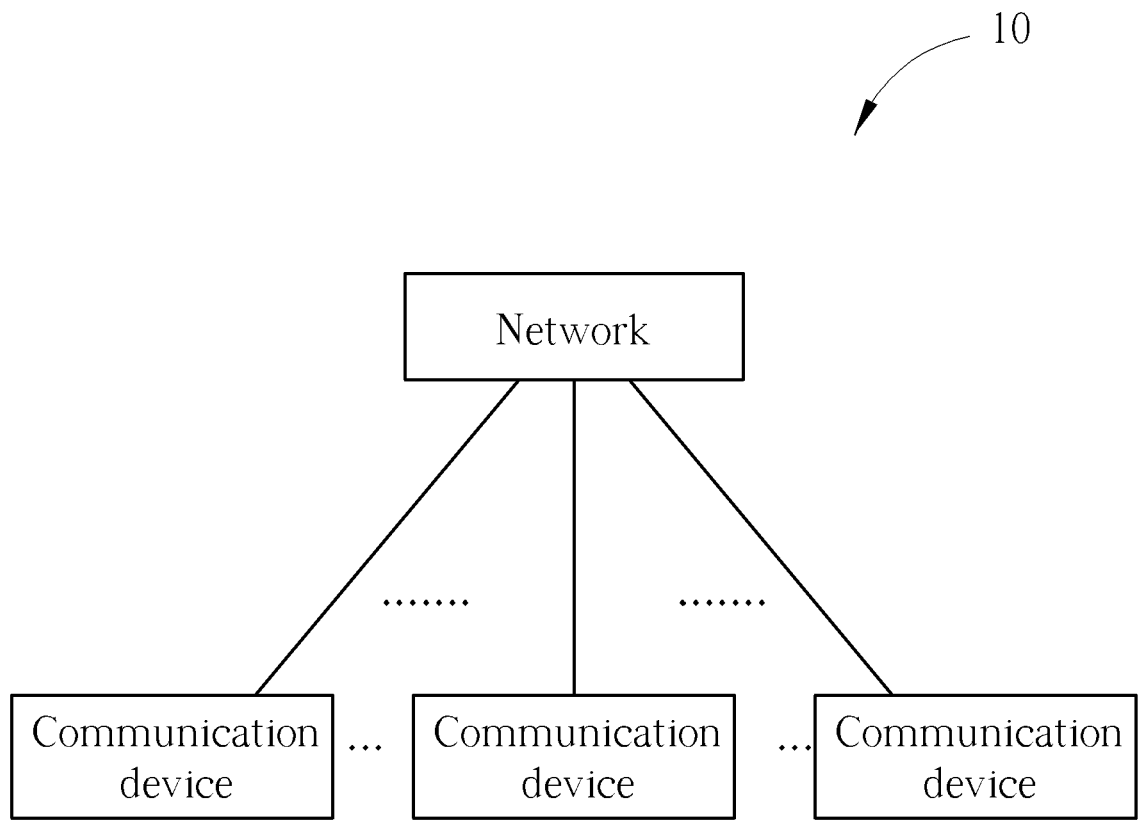
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network and a plurality of communication devices. The wireless communication system 10 may support a time-division duplexing (TDD) mode, a frequency-division duplexing (FDD) mode, a TDD-FDD joint operation mode or a licensed-assisted access (LAA) mode. That is, the network and a communication device may communicate with each other via FDD carrier(s), TDD carrier(s), licensed carrier(s) (licensed cell(s)) and/or unlicensed carrier(s) (unlicensed cell(s)). In addition, the wireless communication system 10 may support a carrier aggregation (CA). That is, the network and a communication device may communicate with each other via multiple serving cells (e.g., multiple serving carriers) including a primary cell (e.g., primary component carrier) and one or more secondary cells (e.g., secondary component carriers).

In FIG. 1, the network and the communication devices are simply utilized for illustrating the structure of the wireless communication system 10. Practically, the network may be a universal terrestrial radio access network (UTRAN) including at least one Node-B (NB) in a universal mobile telecommunications system (UMTS). In another example, the network may be an evolved UTRAN (E-UTRAN) including at least one evolved NB (eNB) and/or at least one relay in a long term evolution (LTE) system, a LTE-Advanced (LTE-A) system or an evolution of the LTE-A system.

Furthermore, the network may also include both the UTRAN/E-UTRAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information may be processed by both the UTRAN/E-UTRAN and the core network, and the decisions are made after coordination and/or cooperation are performed by the UTRAN/E-UTRAN and the core network.

A communication device may be a user equipment (UE), a low cost device (e.g., machine type communication (MTC) device), a device-to-device (D2D) communication device, a mobile phone, a laptop, a tablet computer, an electronic book, a portable computer system, or combination thereof. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
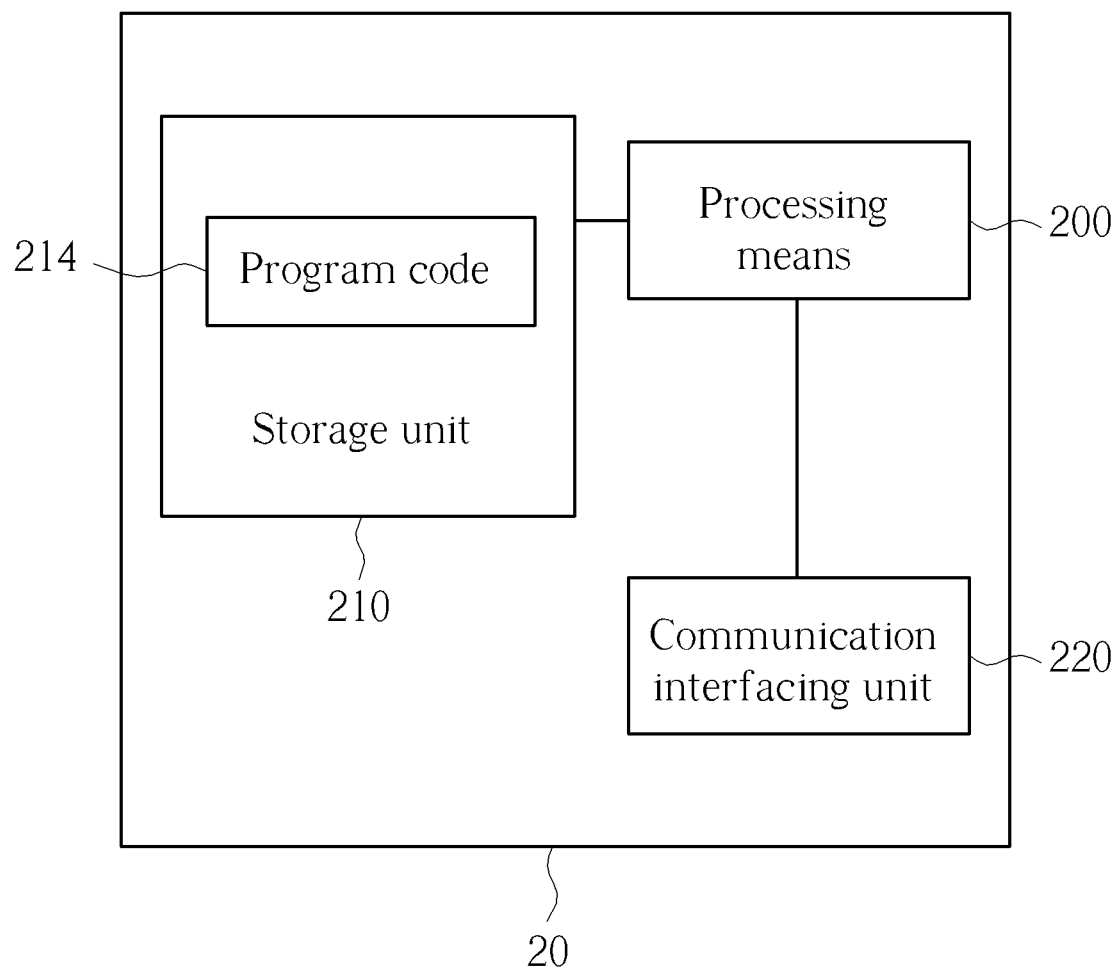
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, messages and/or packets) according to processing results of the processing means 200.

Figure 3:
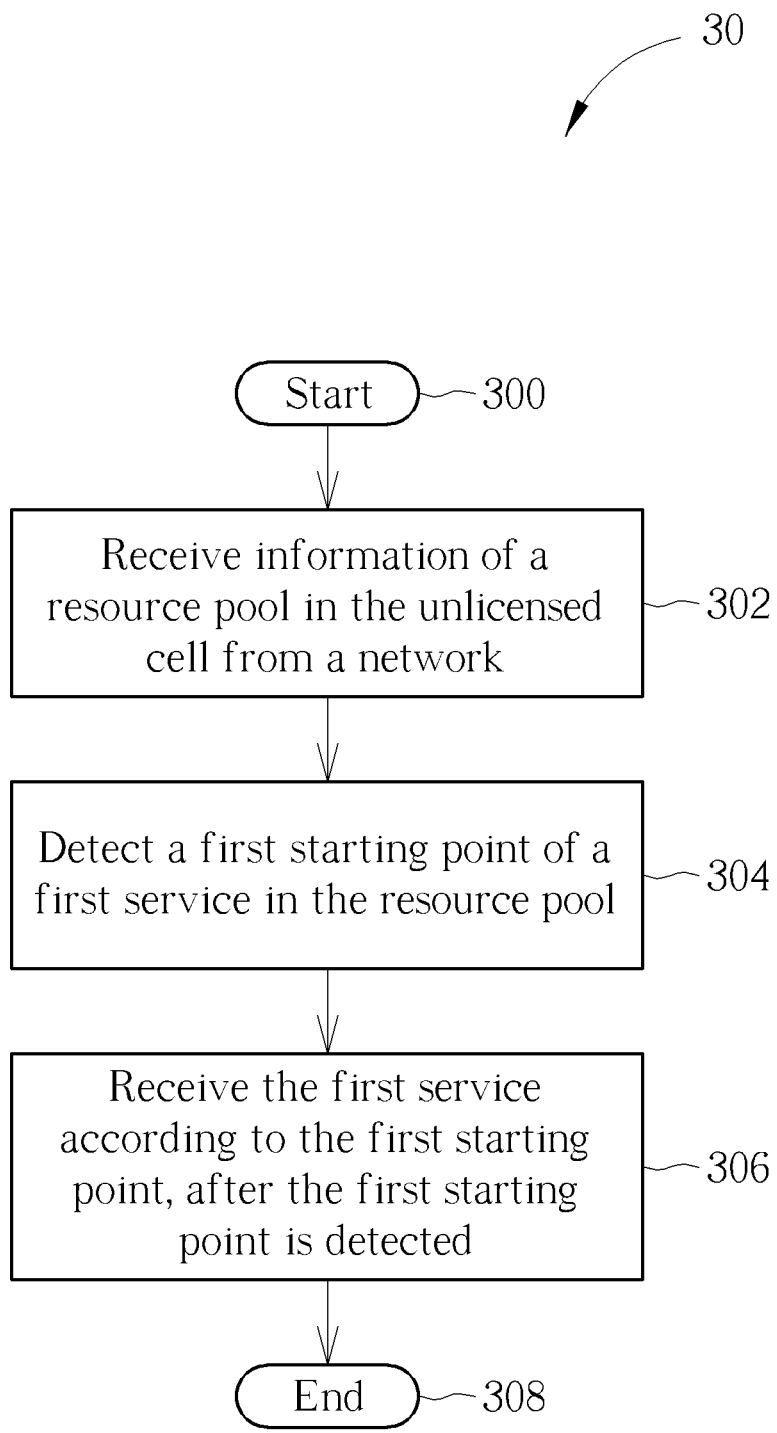
FIG. 3 is a flowchart of a process according to an example of the present invention.

FIG. 3 is a flowchart of a process 30 according to an example of the present invention. The process 30 may be utilized in a communication device shown in FIG. 1, to receive a service in an unlicensed cell. The process 30 may be compiled into the program code 214 and includes the following steps:

Step 300: Start.

Step 302: Receive information of a resource pool in the unlicensed cell from a network.

Step 304: Detect a first starting point of a first service in the resource pool.

Step 306: Receive the first service according to the first starting point, after the first starting point is detected.

Step 308: End.

According to the process 30, the communication device may receive information of a resource pool in the unlicensed cell from a network. Then, the communication device may detect (e.g., blind detection) a first starting point of a first service (e.g., transmission and/or reception of data/signal) in the resource pool, and receive the first service according to the first starting point after the first starting point is detected. That is, the starting point of the service may not be specified by the network in advance due to uncertainty of resources in the unlicensed cell, and the network may only indicate the resource pool to the communication device. According to the present example, the communication device may search for the starting point of the service, and may start to receive the service after the starting point is detected. Thus, the problem of reception of the service in the unlicensed cell is solved. As a result, the resource of the unlicensed cell can be used with a licensed cell to improve throughput of the communication device.

Realization of the process 30 is not limited to the above description.

In one example, the resource pool may include part of a duration of the first service, or may include the duration of the first service. Further, the part of the duration may include one or more orthogonal frequency division multiplexing (OFDM) symbols. In one example, the duration may include multiple subframes. In one example, the information of the resource pool may be received in a higher layer signaling (e.g., radio resource control (RRC) signaling). That is, the information may be received less frequently. In one example, the information of the resource pool may be received in a physical layer signaling (e.g., DL control information (DCI)). That is, the information may be received more frequently. In one example, the information of the resource pool may be received in a licensed cell. That is, the information may be received reliably, because quality of the licensed cell is in general more reliable than that of the unlicensed cell. In one example, the information of the resource pool may include a location of the resource pool. The location may include a time coordinate and/or a frequency coordinate of the resource pool. In another example, the location may include a starting point and/or an end point of the resource pool. In another example, the location may include a length of the resource pool.

In one example, the communication device in the process 30 may receive the first service according to the first starting point and a duration (e.g., length) of the first service. That is, both the starting point and the length may be used for receiving the service. In one example, the communication device may receive information of the duration of the first service from the network. In one example, the information of the duration of the first service may be predetermined in the communication device or the 3GPP standard.

There are various ways for detecting the first starting point in the process 30. In one example, the communication device may detect the first starting point by detecting a discovery signal for the first service. That is, the discovery signal may be transmitted at the beginning of the first service, and the communication device may detect the first starting point by searching for the discovery signal. The discovery signal may include a common reference signal (CRS), a primary synchronization signal (PSS) and/or a secondary synchronization signal (SSS). In one example, the discovery signal and the first service may be transmitted in a same subframe, or may be transmitted in different subframes. In another example, there may not be any discovery signal in the first service.

In addition, the communication device may stop detecting any service in the resource pool, if no service is detected in a period (e.g., few subframes but is not limited) of the resource pool. That is, the communication device may not search the entire period of the resource pool to confirm whether there is a service in the resource pool, but only search a certain time period of the resource pool. The communication device may determine that there is not any service in the resource pool and stop the detection to save the power consumption, if no service is detected in the time period. In another example, the communication device may stop detecting any service in the resource pool, if an indicator in the first service indicates that there is no service in the resource pool. That is, the communication may not need to try the detection to confirm where there is a next service, and the power consumption can further be saved.

There may be multiple services in a resource pool. That is, the communication device in the process 30 may detect a second starting point of a second service in the resource pool, and may receive the second service according to the second starting point after the second starting point is detected. Detection and reception of the second service may be similar to those of the first service, and are not narrated herein. In one example, the communication device may detect the second starting point according to an indicator in the first service which indicates whether there is another service in the resource pool. In one example, the first service (and/or the second service) may include (or simply be) a licensed assisted access (LAA) service defined in a 3rd Generation Partnership Project (3GPP) standard. Content of the LAA service is not limited herein. For example, DL data assignment, UL transmission and/or channel state information (CSI)/radio resource management (RRM) measurement may be processed (e.g., transmitted, received and/or performed) via the LAA service.

Figure 4:
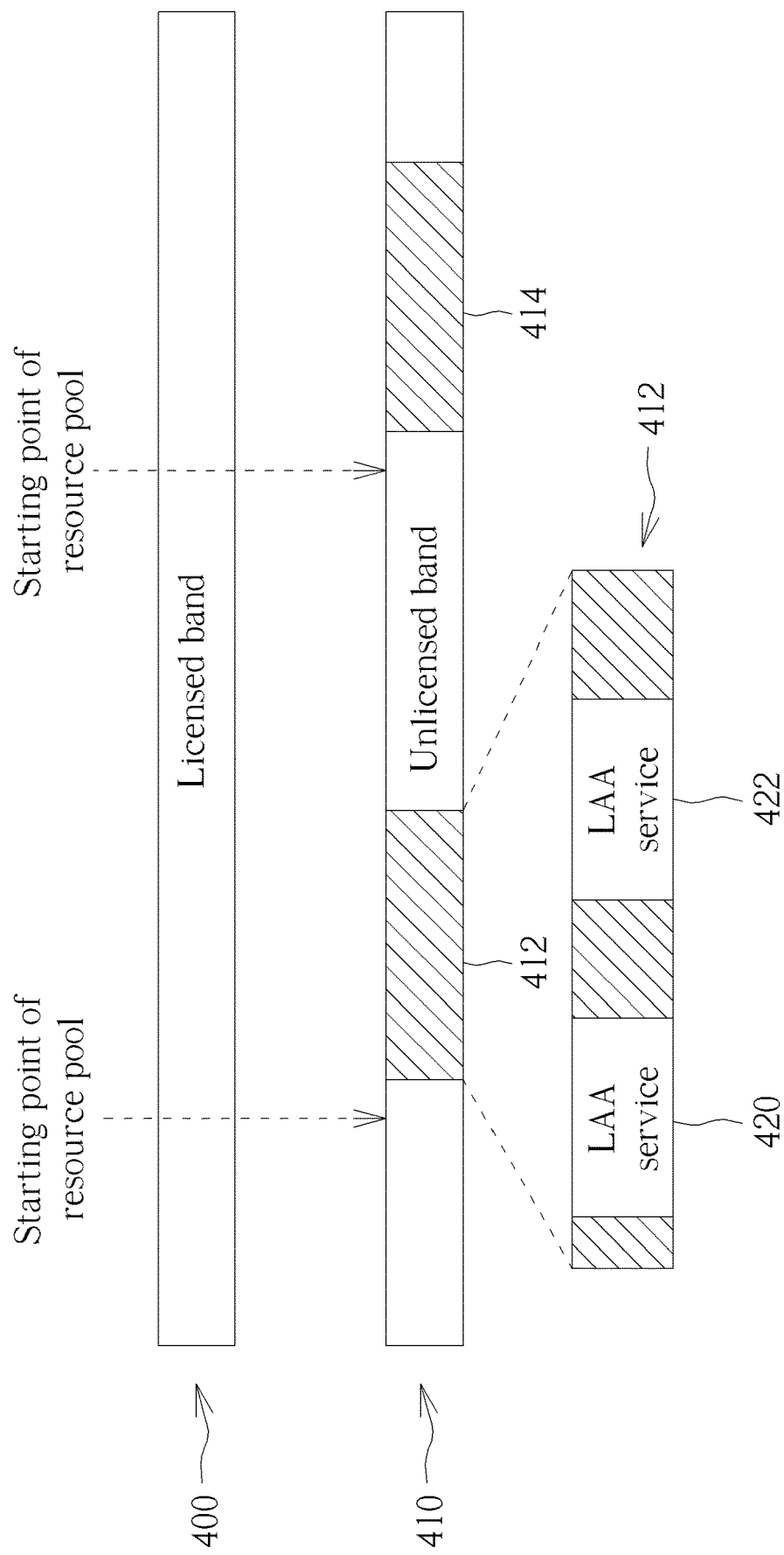
FIG. 4 is a schematic diagram of reception of a service in an unlicensed cell according to an example of the present invention.

FIG. 4 is a schematic diagram of reception of a service in an unlicensed cell according to an example of the present invention. As shown in FIG. 4, there are a licensed cell 400, an unlicensed cell 410, and resource pools 412 and 414. As an example, there are LAA services 420 and 422 provided in the resource pool 412. In the present example, the licensed cell 400 may be used by a primary cell of the network, and the unlicensed cell 410 may be used by a secondary cell of the network. Further, the primary cell may be controlled by an eNB, and the secondary cell may be controlled by the eNB or a remote radio head (RRH) of the eNB. The eNB may provide the information of the resource pool 412 via the licensed cell 400 to a communication device. Accordingly, the communication device may know a location of the resource pool 412. The communication device may start to search the resource pool 412, to detect (e.g., blind detection) whether there is a LAA service in the resource pool 412. The communication device may search for the LAA service by detecting a starting point of the LAA service. The detection of the starting point may be realized by detecting a discovery signal in the LAA service or by detecting content of the LAA service directly, and is not limited herein. Accordingly, the communication device can detect the starting point of the LAA service 420, and is able to receive the LAA service 420.

After receiving the LAA service 420, the communication device may determine whether there is a next LAA service to be received. In one example, the communication device may determine the existence of the next LAA service according to an indicator in the LAA service 420 which indicates the next LAA service. In one example, the communication device may determine the existence of the next LAA service by detecting a starting point of the next LAA service in the rest part of the resource pool 412. In either ways, the communication device can detect the starting point of the LAA service 422 in the present example, and receive the LAA service 422. Then, the communication device may continue to search for a next LAA service in the resource pool 412, or may simply determine there is no service in the resource pool 412 according to an indicator in the LAA service 422.

Figure 5:
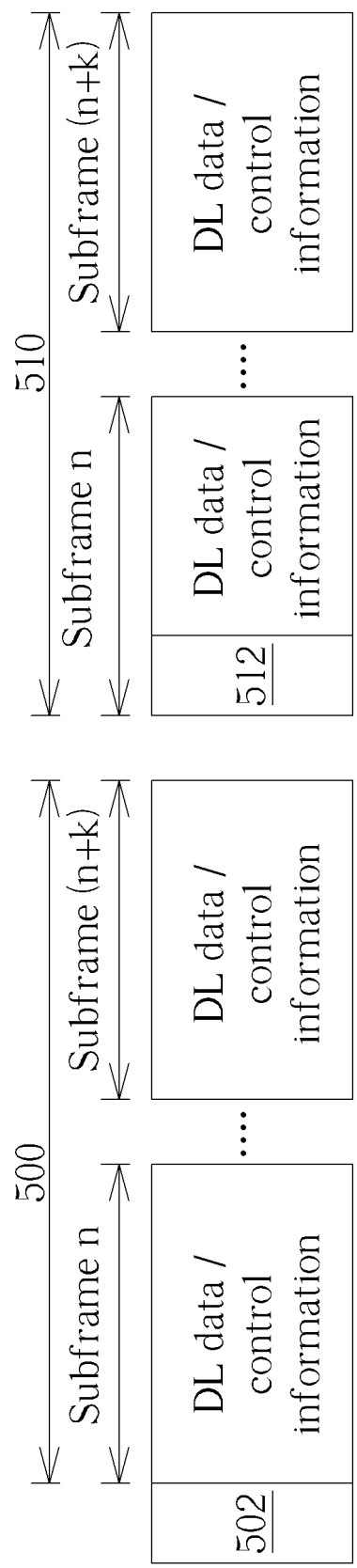
FIG. 5 is a schematic diagram of a discovery signal for a LAA service according to an example of the present invention.

FIG. 5 is a schematic diagram of a discovery signal for a LAA service according to an example of the present invention. There are LAA services 500 and 510 in FIG. 5 for illustrating different methods of transmitting a discovery signal. The LAA service 500 includes DL data and/or control information in subframes n, . . . , (n+k), wherein k is a non-negative integer. A discovery signal 502 is appended to the LAA service 500. Note that the discovery signal 502 is not transmitted in a subframe (i.e., the subframe n) where the LAA service 500 is transmitted. On the other hand, the LAA service 510 includes DL data and/or control information transmitted in subframes n, . . . , (n+k) and a discovery signal 512 for the LAA service 510. The discovery signal 512 is transmitted in a subframe (i.e., the subframe n) where the LAA service 510 is transmitted. That is, the discovery signal may be part of the LAA service. As can be seen, a discovery signal may be transmitted in a subframe where a LAA service is transmitted. Alternatively, the discovery signal and the LAA service may be transmitted different subframes.

It should be noted that although the examples are illustrated based on the process 30, to clarify the operations of the communication device. The examples can be combined and/or modified arbitrarily according to system requirements and/or design considerations.

Figure 6:
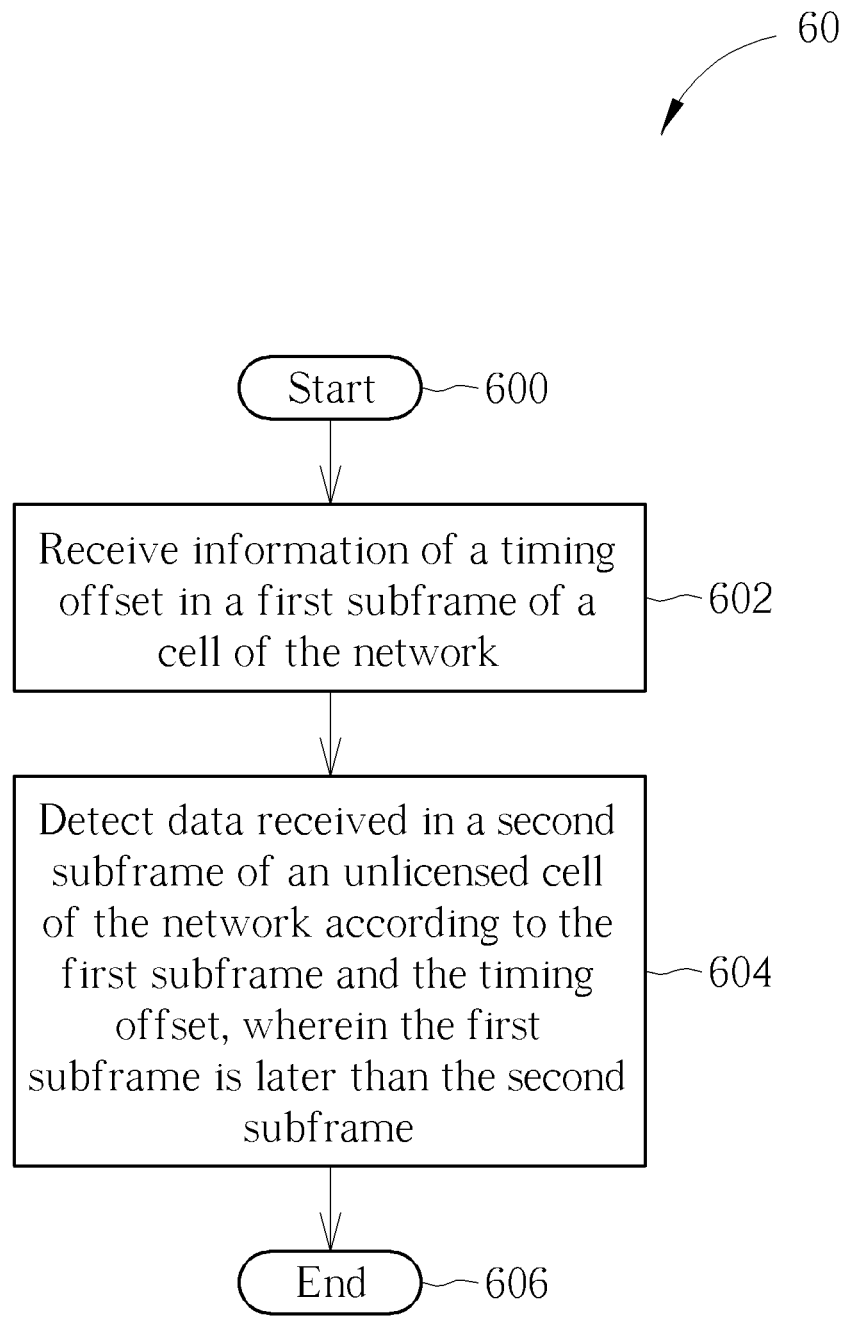
FIG. 6 is a flowchart of a process according to an example of the present invention.

FIG. 6 is a flowchart of a process 60 according to an example of the present invention. The process 60 may be utilized in a communication device shown in FIG. 1, to handle a data detection in an unlicensed cell. The process 60 may be compiled into the program code 214 and includes the following steps:

Step 600: Start.

Step 602: Receive information of a timing offset in a first subframe of a cell of the network.

Step 604: Detect data received in a second subframe of an unlicensed cell of the network according to the first subframe and the timing offset, wherein the first subframe is later than the second subframe.

Step 606: End.

According to the process 60, the communication device may receive information of a timing offset in a first subframe of a cell (i.e., serving cell) of the network. Then, the communication device may detect data (e.g., blind detection) received in a second subframe of an unlicensed cell (i.e., serving cell) of the network according to the first subframe and the timing offset, wherein the first subframe is later than the second subframe. That is, the data is first stored in the communication device, and the communication device starts to detect the stored data after receiving the information of the timing offset. Thus, the problem that the transmission from the network may be delayed due to uncertain availability of the resource of the unlicensed cell is solved. As a result, the resource of the unlicensed cell can be used with the cell to improve throughput of the communication device.

Realization of the process 60 is not limited to the above description.

In one example, the cell in the process 60 may be a licensed cell, may be the unlicensed cell, or may be another unlicensed cell. That is, the information of the timing offset may be received via various types of the cells. In one example, subframe indices of the first subframe and the second subframe may be the same. In one example, the communication device may transmit a hybrid automatic repeat request (HARQ) feedback in response to the data in a third subframe of the cell according to the first subframe. In one example, the information of the timing offset in the process 60 may be transmitted in DL control information (DCI) of the first subframe. That is, one or more bits in the DCI may be used for carrying the information of the timing offset. Further, the DCI may also include a DL assignment indicating a reception of the data in the second subframe.

In one example, a distance between the first subframe and the third subframe for a FDD mode may be four subframes. In one example, the timing offset may include a number of OFDM symbols and/or a number of subframes. That is, a precision (i.e., granularity) of the timing offset is not limited. In one example, the information of the timing offset may be represented by at least one bit. That is, the bit(s) may be used for indicating the timing offset to the communication device. In one example, the communication device may further receive an indicator in the first subframe of the cell of the network, wherein the indicator indicates that at least the second subframe is a schedulable subframe. That is, the second subframe (and may be other subframe(s)) is available for the network to transmit data. Further, the indicator may include (or simply be) a discovery signal. However, the communication device may need to perform a detection (e.g., blind detection) in the second subframe to determine whether there is data for the communication device in the second subframe.

Figure 7:
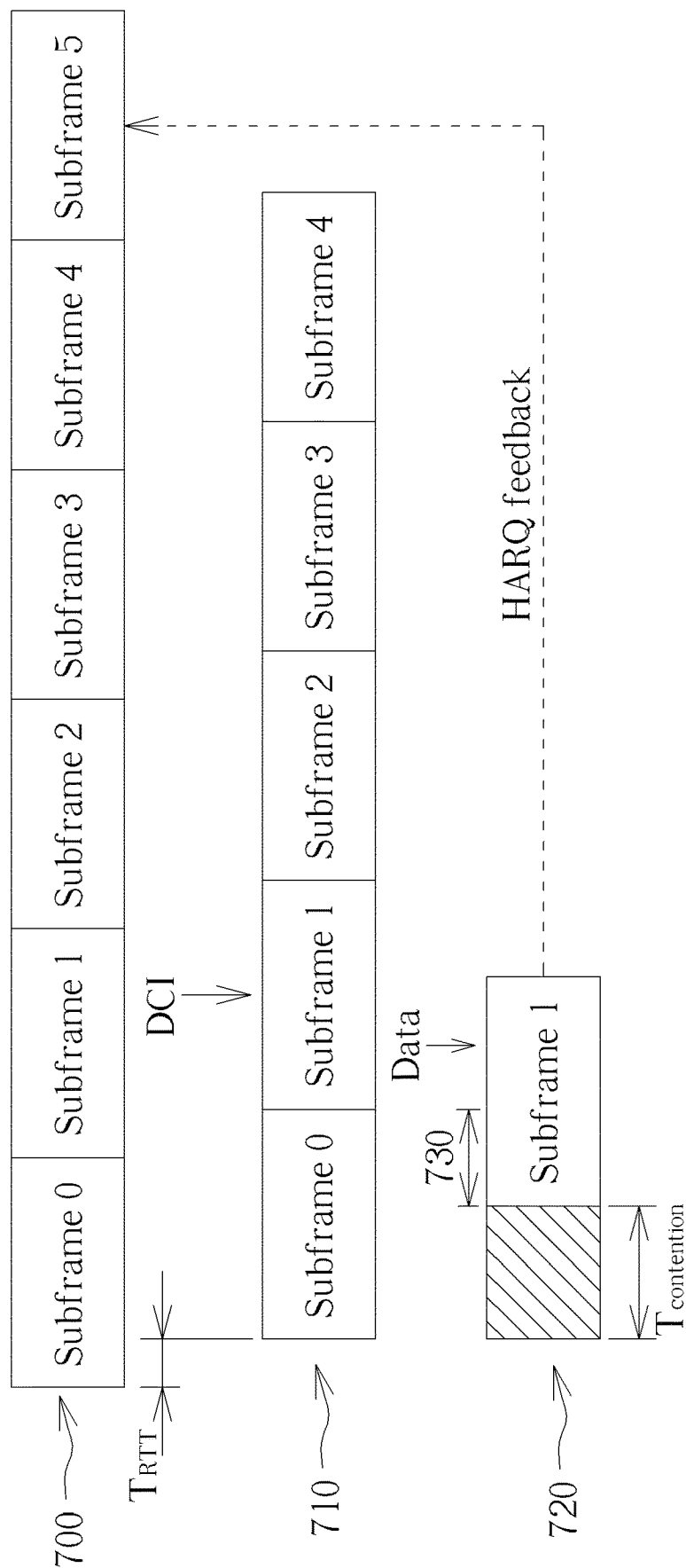
FIG. 7 is a schematic diagram of transmission of a HARQ feedback for an unlicensed cell according to an example of the present invention.

FIG. 7 is a schematic diagram of transmission of a HARQ feedback for an unlicensed cell according to an example of the present invention. As shown in FIG. 7, there are a licensed cell 700, a licensed cell 710 and an unlicensed cell 720, wherein the licensed cells 700 and 710 are for FDD UL and FDD DL operations, respectively. In the present example, the licensed cells 700 and 710 may be primary cells of the network, and the unlicensed cell 720 may be a secondary cell of the network and is not limited herein. Further, the primary cells may be controlled by an eNB, and the secondary cell may be controlled by the eNB or a RRH of the eNB.

Due to characteristics of a wireless channel, there may be a round trip time (RTT) $T_{RTT}$ between the corresponding subframes of the licensed cells 700 and 710, and there may be a contention delay $T_{contention}$ between a subframe 0 of the licensed cell 710 and a subframe 1 of the unlicensed cell 720. The communication device may receive and store data in the subframe 1 of the unlicensed cell 720, and a HARQ feedback in response to the data should be transmitted. According to the present invention, the communication device may receive DCI (e.g., DL assignment DCI) in the subframe 1 of the licensed cell 710 from the network, and the DCI may include information of a timing offset for the unlicensed cell 720. For example, the timing offset may indicate a time difference 730 between the subframe 1 of the licensed cell 710 and the subframe 1 of the unlicensed cell 720. Then, the communication device may transmit the HARQ feedback in the subframe 5 of the licensed cell 700 the according to the subframe 1 of the unlicensed cell 720 (i.e., (n+4) rule for the FDD mode) and the time offset.

Figure 8:
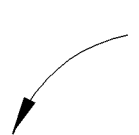
FIG. 8 is a table of timing offsets according to an example of the present invention.

FIG. 8 is a table 80 of timing offsets according to an example of the present invention. In FIG. 8, the information of the timing offset, $L_{offset}$, are represented by 3 bits. For example, the network may transmit the bits "101" (i.e., $L_{offset}=5$) to the communication device, to indicate that the timing offset is 5 OFDM symbols.

Figure 9:
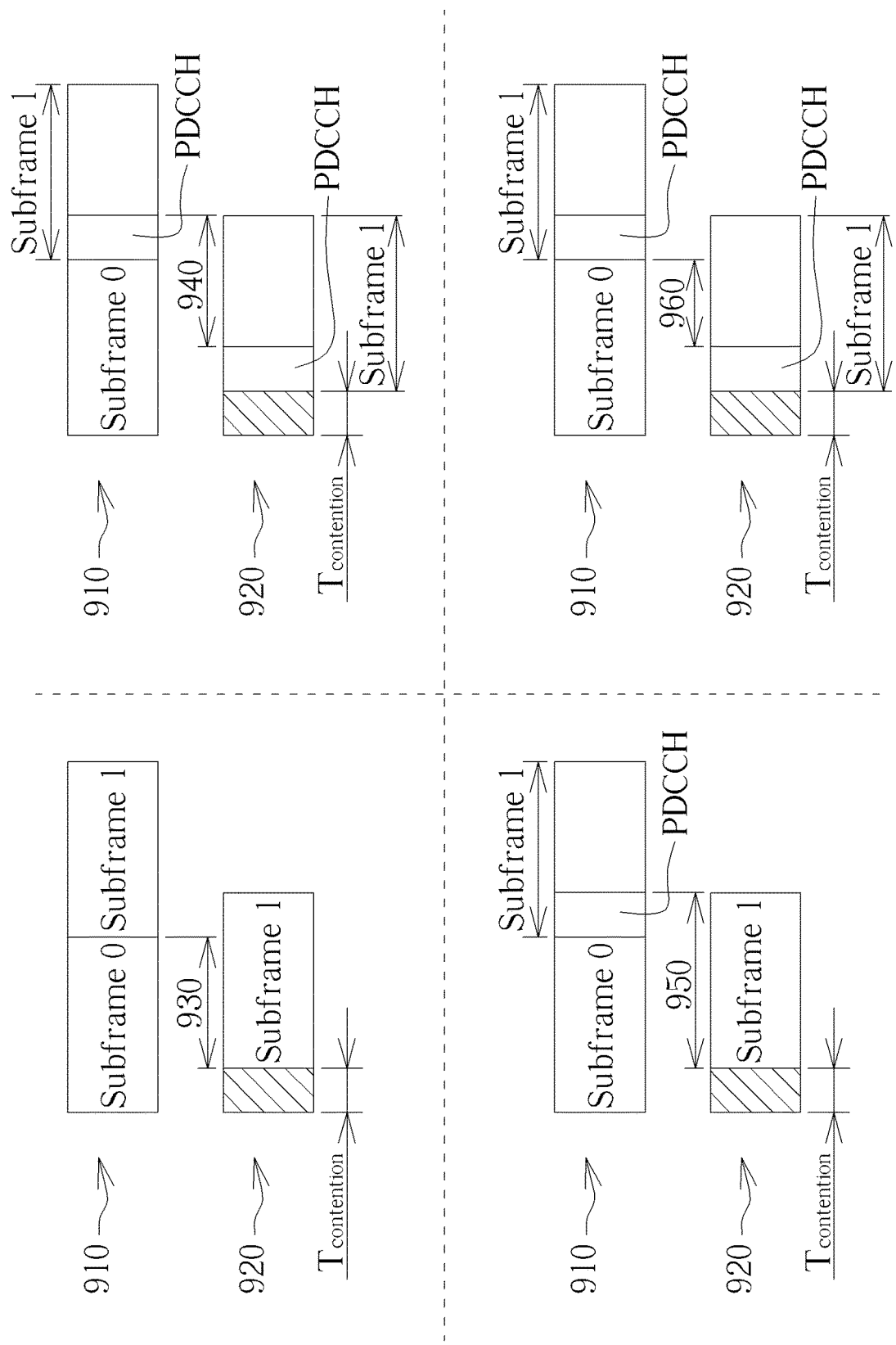
FIG. 9 is a schematic diagram of definitions of a timing offset according to an example of the present invention.

FIG. 9 is a schematic diagram of definitions of a timing offset according to an example of the present invention. As shown in FIG. 9, there are a licensed cell 910 and an unlicensed cell 920, wherein the licensed cell 910 is for FDD DL operations. In the present example, the licensed cell 910 may be managed by a primary cell of the network, and the unlicensed cell 920 may be managed by a secondary cell of the network. Further, the primary cell may be controlled by an eNB, and the secondary cell may be controlled by the eNB or a RRH of the eNB. Due to a contention for a wireless channel, there may be a contention delay $T_{contention}$ between the corresponding subframes of the licensed cell 910 and the unlicensed cell 920. In FIG. 9, there are 4 timing offsets 930, 940, 950 and 960 defined differently according to examples of the present invention. The timing offset 930 may be defined as a difference between a starting point of the subframe 1 of the licensed cell 910 and a starting point of the subframe 1 of the unlicensed cell 920. The timing offset 940 may be defined as a difference between an end point of a physical DL control channel (PDCCH) of the subframe 1 of the licensed cell 910 and an endpoint of a PDCCH of the subframe 1 of the unlicensed cell 920. The timing offset 950 may be defined as a difference between the end point of the PDCCH of the subframe 1 of the licensed cell 910 and the starting point of the subframe 1 of the unlicensed cell 920. The timing offset 960 may be defined as a difference between the starting point of the subframe 1 of the licensed cell 910 and the end point of the PDCCH of the subframe 1 of the unlicensed cell 920. It should be noted that other definitions of the timing offset can be designed according to the above examples, and are not narrated herein.

Figure 10:
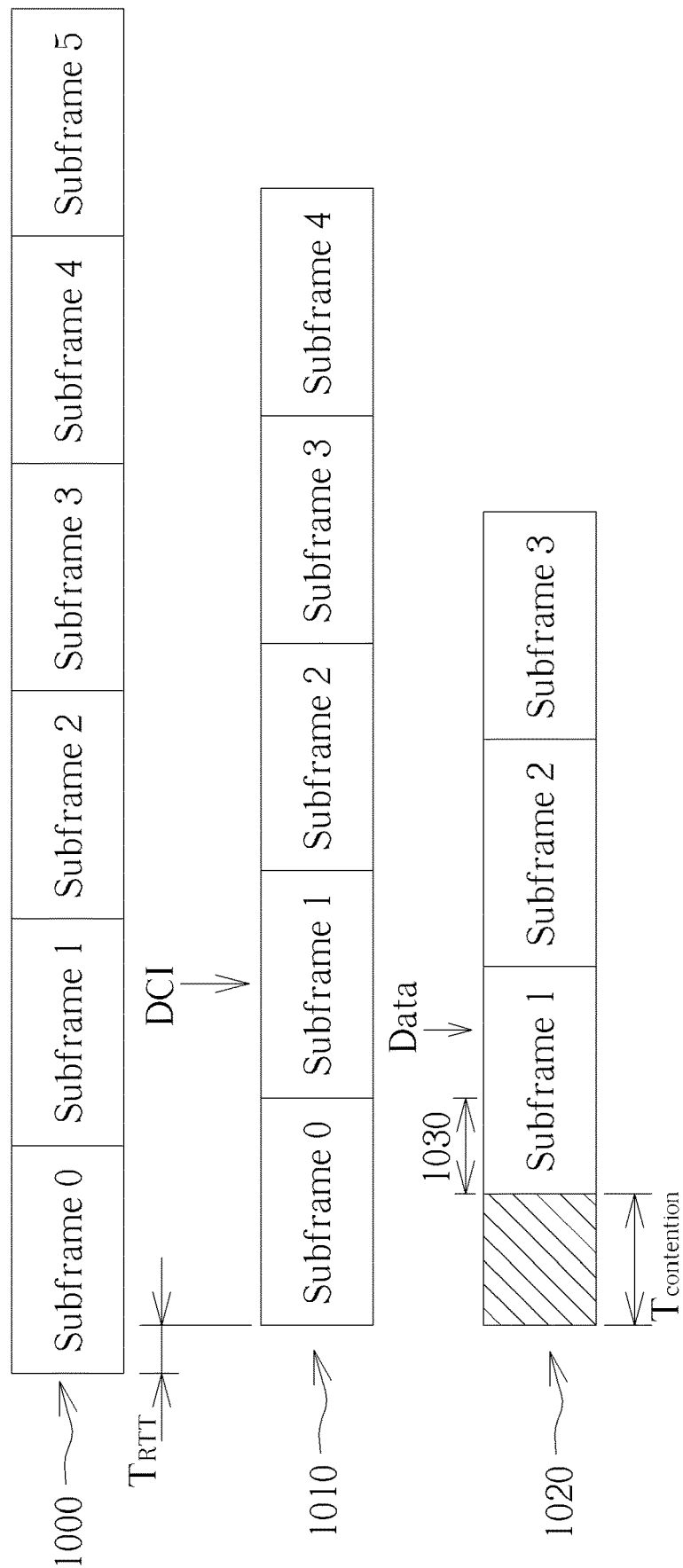
FIG. 10 is a schematic diagram of a detection of data from an unlicensed cell according to an example of the present invention.

FIG. 10 is a schematic diagram of a detection of data from an unlicensed cell according to an example of the present invention. As shown in FIG. 10, there are a licensed cell 1000, a licensed cell 1010 and an unlicensed cell 1020, wherein the licensed cells 1000 and 1010 are for FDD UL and FDD DL operations, respectively. In the present example, the licensed cells 1000 and 1010 may be primary cells of the network, and the unlicensed cell 1020 may be a secondary cell of the network and is not limited herein. Further, the primary cells may be controlled by an eNB, and the secondary cell may be controlled by the eNB or a RRH of the eNB.

Due to characteristics (e.g., contention) of a wireless channel, there may be a RTT $T_{RTT}$ between the corresponding subframes of the licensed cells 1000 and 1010, and there may be a contention delay $T_{contention}$ between a subframe 0 of the licensed cell 1010 and a subframe 1 of the unlicensed cell 1020. The communication device may receive and store data in subframes of the unlicensed cell 1020, and may not know how to detect the data belonging to it. According to the present invention, the communication device may receive DCI in the subframe 1 of the licensed cell 1010 from the network, and the DCI may include information of a timing offset for the unlicensed cell 1020 and may include an indicator indicating at least one schedulable subframe of the unlicensed cell 1020. For example, the timing offset may indicate a time difference 1030 between the subframe 1 of the licensed cell 1010 and the subframe 1 of the unlicensed cell 1020. In the present example, the schedulable subframes may be subframes 1-3 of the unlicensed cell 1020. Then, the communication device may detect (e.g., blind detection) the data in the subframes 1-3 of the licensed cell 1020 according to the subframe 1 of the licensed cell 1010 and the time difference 1030, to obtain the data (which may not be available) for the communication device.

Figure 11:
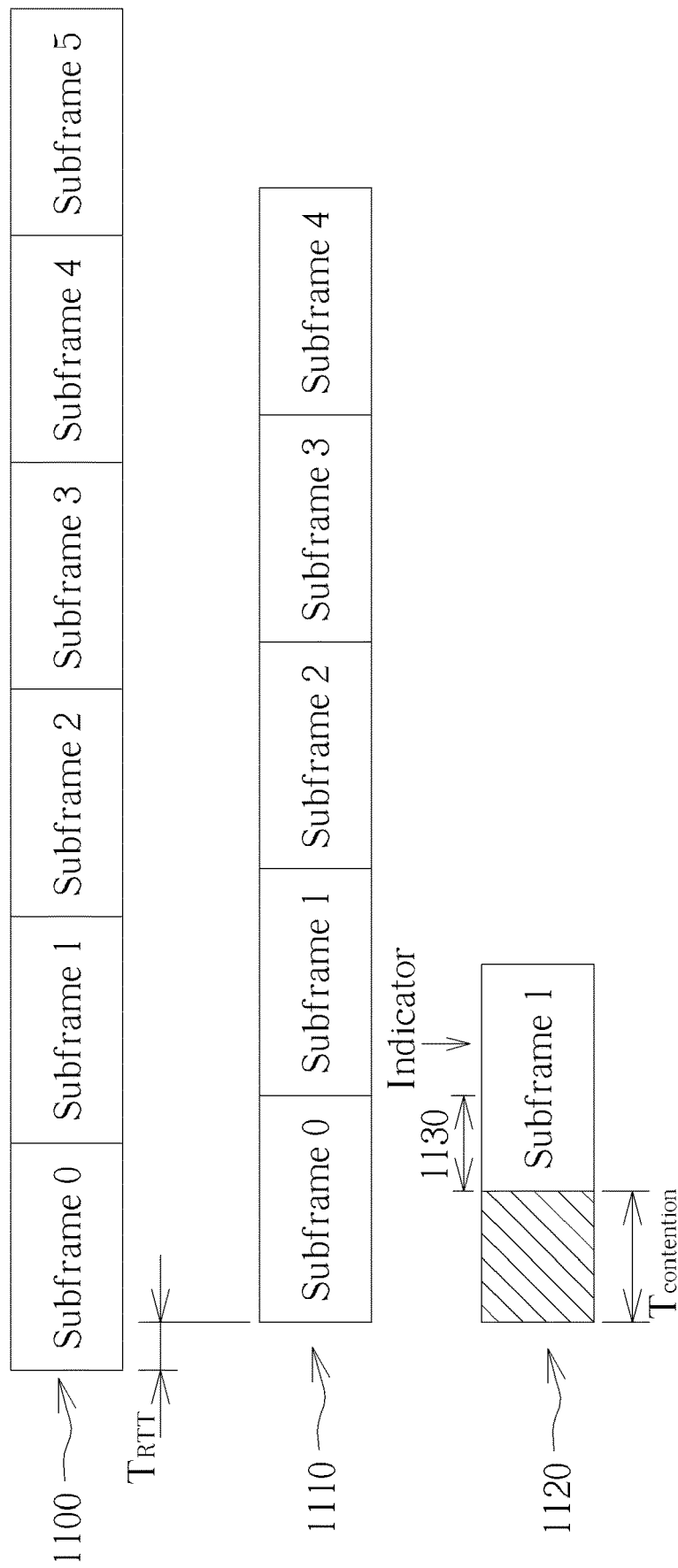
FIG. 11 is a schematic diagram of a detection of data and a transmission of a HARQ feedback for an unlicensed cell according to an example of the present invention.

FIG. 11 is a schematic diagram of a detection of data and a transmission of a HARQ feedback for an unlicensed cell according to an example of the present invention. As shown in FIG. 11, there are a licensed cell 1100, a licensed cell 1110 and an unlicensed cell 1120, wherein the licensed cells 1100 and 1110 are for FDD UL and FDD DL operations, respectively. In the present example, the licensed cells 1100 and 1110 may be primary cells of the network, and the unlicensed cell 1120 may be a secondary cell of the network and is not limited herein. Further, the primary cells may be controlled by an eNB, and the secondary cell may be controlled by the eNB or a RRH of the eNB.

Due to characteristics (e.g., contention) of a wireless channel, there may be a RTT $T_{RTT}$ between the corresponding subframes of the licensed cells 1100 and 1110, and there may be a contention delay $T_{contention}$ between a subframe 0 of the licensed cell 1110 and a subframe 1 of the unlicensed cell 1120. The communication device may receive and store data in the subframe 1 of the unlicensed cell 1120, and a HARQ feedback in response to the data should be transmitted. According to the present invention, the communication device may try to detect an indicator in a subframe of the unlicensed cell 1120, and may receive the indicator in the subframe 1 of the unlicensed cell 1120 from the network. The indicator may be a discovery signal which may include a CRS, a PSS and/or a SSS such that the indicator may be detected and processed by the communication device. The indicator may include information (e.g., subframe index) of the subframe 1 of the unlicensed cell 1120 and/or information of at least one schedulable subframe of the unlicensed cell 1120. In the present example, the schedulable subframe may be at least the subframe 1 of the unlicensed cell 1120. Accordingly, the communication device may detect (e.g., blind detection) the data in the subframe 1 of the licensed cell 1120 according to the indicator, to obtain the data for the communication device. Then, the communication device may transmit a HARQ feedback in a subframe 5 of the licensed cell 1100 the according to the subframe 1 of the unlicensed cell 1120 (i.e., (n+4) rule for the FDD mode).

It should be noted that although the examples are illustrated based on the process 60, to clarify the operations of the communication device. The examples can be combined and/or modified arbitrarily according to system requirements and/or design considerations.

Figure 12:
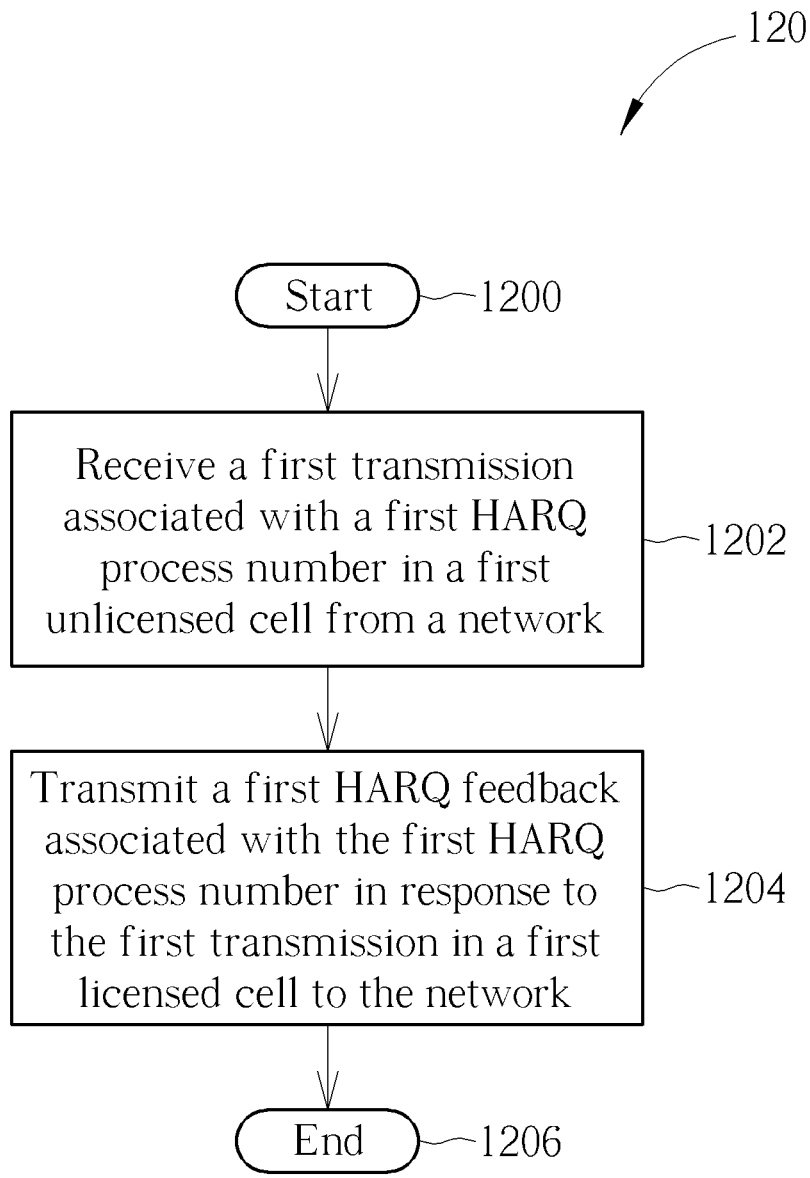
FIG. 12 is a flowchart of a process according to an example of the present invention.

FIG. 12 is a flowchart of a process 120 according to an example of the present invention. The process 120 may be utilized in a communication device shown in FIG. 1, to handle a HARQ feedback for an unlicensed cell. The process 120 may be compiled into the program code 214 and includes the following steps:

Step 1200: Start.

Step 1202: Receive a first transmission associated with a first HARQ process number in a first unlicensed cell from a network.

Step 1204: Transmit a first HARQ feedback associated with the first HARQ process number in response to the first transmission in a first licensed cell to the network.

Step 1206: End.

According to the process 120, the communication device may receive a first transmission (e.g., data transmission) associated with a first HARQ process number in a first unlicensed cell (i.e., serving cell) from a network, and may transmit a first HARQ feedback associated with the first HARQ process number in response to the first transmission in a first licensed cell (i.e., serving cell) to the network. That is, not only the HARQ feedback is transmitted in the licensed cell in response to the transmission in the unlicensed cell, but the same HARQ process number is used to identify the transmission and the corresponding HARQ feedback. Thus, the problem of transmission of the HARQ feedback is solved. As a result, the resource of the unlicensed cell can be used with the licensed cell to improve throughput of the communication device.

Realization of the process 120 is not limited to the above description.

In one example, the first transmission in the process 120 may be a new transmission. In one example, the first transmission may be a retransmission corresponding to a previous transmission. Further, the previous transmission may be received in the first licensed cell, may be received in the first unlicensed cell, may be received in a second licensed cell, or may be received in a second unlicensed cell from the network. That is, the present transmission and the previous transmission may be received in the same cell or different cells.

In one example, the first transmission may be further associated with a cell identification (ID) of the first licensed cell. That is, the cell ID and the HARQ process number may be used jointly to identify the transmission. In one example, the cell ID may be received in DL control information (DCI) from the network. In one example, the first HARQ process number may also be received in DCI from the network.

In one example, the communication device in the process 120 may transmit the first HARQ feedback in the first licensed cell according to an association between the first unlicensed cell and the first licensed cell. That is, there may be multiple licensed cells and multiple unlicensed cells. The unlicensed cell and the licensed cell may be associated with each other, such that the communication device can determine (e.g., select) the cells for the transmissions (e.g. DL transmissions) and the HARQ feedback according to the association. In one example, the association may be configured by a higher layer signalling from the network.

The communication device may handle multiple transmissions and corresponding HARQ feedbacks according to the present invention. In detail, the communication device in the process 120 may further receive a second transmission associated with a second HARQ process number from a second unlicensed cell of the network, and may transmit a second HARQ feedback associated with the second HARQ process number in response to the second transmission to a second licensed cell of the network. The first licensed cell and the second licensed cell may be the same licensed cell, or may be different licensed cells. The first unlicensed cell and the second unlicensed cell may be the same unlicensed cell, or may be different unlicensed cells. According to the previous description, cell IDs of the cells and the HARQ process numbers can be used to distinguish the transmissions and the corresponding HARQ feedbacks transmitted/received in the cells.

Figure 13:
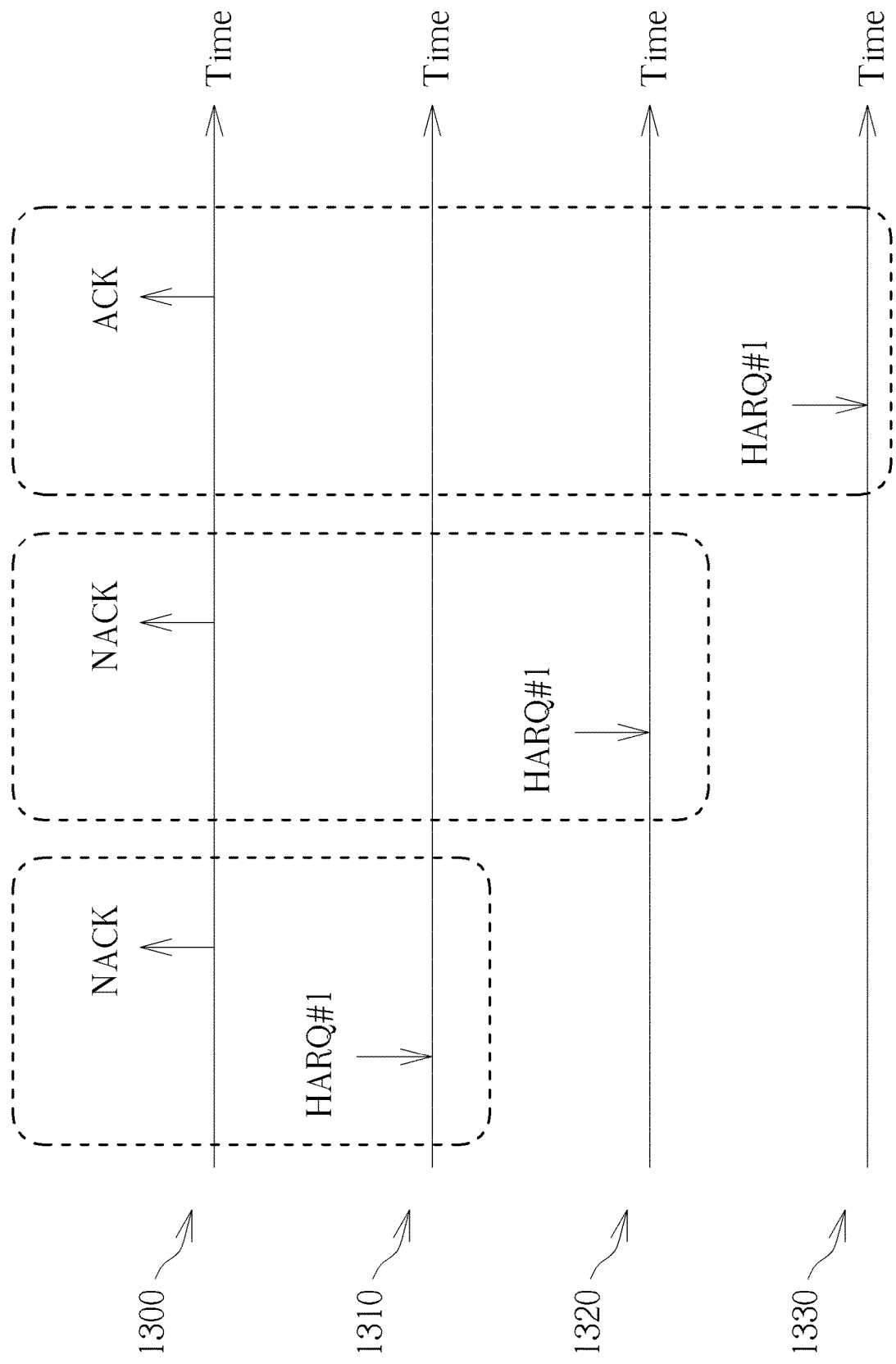
FIG. 13 is a schematic diagram of transmission of a HARQ feedback for unlicensed cells according to an example of the present invention.

FIG. 13 is a schematic diagram of transmission of a HARQ feedback for unlicensed cells according to an example of the present invention. As shown in FIG. 13, there are a licensed cell 1300, a licensed cell 1310, an unlicensed cell 1320 and an unlicensed cell 1330, wherein the licensed cells 1300 and 1310 are for FDD UL and FDD DL operations, respectively. In the present example, the licensed cells 1300 and 1310 may be primary cells of the network, and the unlicensed cells 1320 and 1330 may be secondary cells of the network and is not limited herein. Further, the primary cells may be controlled by an eNB, and the secondary cells may be controlled by the eNB or a RRH of the eNB. The HARQ process number of transmissions in FIG. 13 is 1 (i.e., label "#1").

The operations of the communication device and the network in FIG. 13 are detailed as follows. The communication device may receive a new transmission in the licensed cell 1310 from the network, and the reception of the transmission is incorrect, e.g., due to instability of the wireless channel. The communication device transmits a corresponding HARQ feedback including a NACK in the licensed cell 1300 to the network, to notify the network that the transmission (Label: #1) is not received correctly. Then, the network transmits a retransmission in the unlicensed cell 1320 to the communication device according to the NACK. The retransmission is not received correctly either. The communication device transmits another HARQ feedback including a NACK in the licensed cell 1300 to the network. Then, the network transmits another retransmission in the unlicensed cell 1330 to the communication device according to the NACK. At this time, the retransmission is received correctly. The communication device transmits a HARQ feedback including an ACK in the licensed cell 1300 to the network, to notify the network that the transmission (Label: #1) is received correctly. As can be seen, resources of the licensed cells and the unlicensed cells are used jointly to complete the transmission of the same HARQ process. In addition, the numbering of the HARQ process number is used jointly for the licensed cells and the unlicensed cells. Thus, even if congestion occurs in the licensed cells, the resources of the unlicensed cells can be used to complete the transmission of the same HARQ process.

Figure 14:
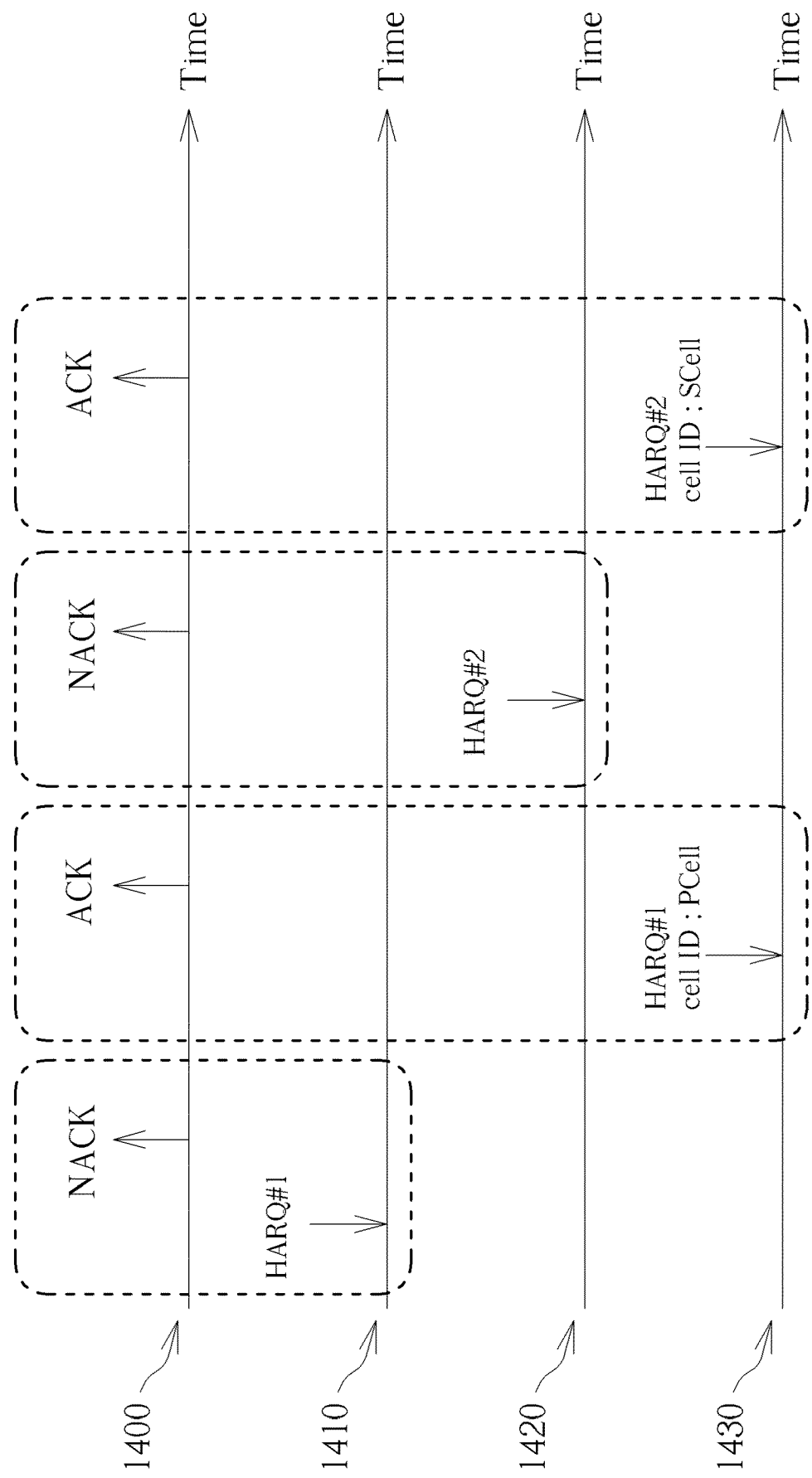
FIG. 14 is a schematic diagram of transmission of HARQ feedbacks for an unlicensed cell according to an example of the present invention.

FIG. 14 is a schematic diagram of transmission of HARQ feedbacks for an unlicensed cell according to an example of the present invention. As shown in FIG. 14, there are a licensed cell 1400, a licensed cell 1410, a licensed cell 1420 and an unlicensed cell 1430, wherein the licensed cell 1400 is for FDD UL operations, and the licensed cells 1410 and 1420 are for FDD DL operations. In the present example, the licensed cells 1400 and 1410 may be primary cells of the network. The licensed cell 1420 and the unlicensed cell 1430 may be secondary cells of the network, and is not limited herein. Further, the primary cells may be controlled by an eNB, and the secondary cells may be controlled by the eNB or a RRH of the eNB. The first set of (re)transmissions in FIG. 14 is labeled with the HARQ process number 1 (i.e., label "#1"). The second set of (re)transmissions in FIG. 14 is labeled with the HARQ process number 2 (i.e., label "#2"). The set of (re)transmissions is further associated with a cell ID: PCell or SCell, if the set of (re)transmissions in the unlicensed cell 1430.

The operations of the communication device and the network in FIG. 14 are detailed as follows. The communication device may receive a new transmission (Label: #1) in the licensed cell 1410 from the network, and the reception of the transmission is incorrect, e.g., due to instability of the wireless channel. The communication device transmits a corresponding HARQ feedback including a NACK in the licensed cell 1400 to the network, to notify the network that the transmission (Label: #1) is not received correctly. Then, the network transmits a retransmission (Label: #1, PCell) in the unlicensed cell 1430 to the communication device according to the NACK. The retransmission is received correctly. The communication device transmits a HARQ feedback including an ACK in the licensed cell 1400 to the network, to notify the network that the transmission (Label: #1) is received correctly. Similarly, the communication device may receive a new transmission (Label: #2) in the licensed cell 1420 from the network, and the reception of the transmission is incorrect, e.g., due to instability of the wireless channel. The communication device transmits a corresponding HARQ feedback including a NACK in the licensed cell 1400 to the network, to notify the network that the transmission (Label: #2) is not received correctly. Then, the network transmits a retransmission (Label: #2, SCell) in the unlicensed cell 1430 to the communication device according to the NACK. The retransmission is received correctly. The communication device transmits a HARQ feedback including an ACK in the licensed cell 1400 to the network, to notify the network that the transmission (Label: #2) is received correctly. As can be seen, resources of the licensed cells and the unlicensed cells are used jointly to complete the transmission. As can be seen, resources of the licensed cells and the unlicensed cells are used jointly to complete the transmission of the same HARQ process. In addition, the numbering of the HARQ process number is used jointly for the licensed cells and the unlicensed cells. Thus, even if congestion occurs in the licensed cells, the resources of the unlicensed cells can be used to complete the transmission. In addition, multiple HARQ processes can be processed without ambiguity due the usage of the cell ID.

It should be noted that although the examples are illustrated based on the process 120, to clarify the operations of the communication device. The examples can be combined and/or modified arbitrarily according to system requirements and/or design considerations.

It should be noted that a time difference mentioned above may be defined in various ways. Several examples are illustrated in the following description.

Figure 15:
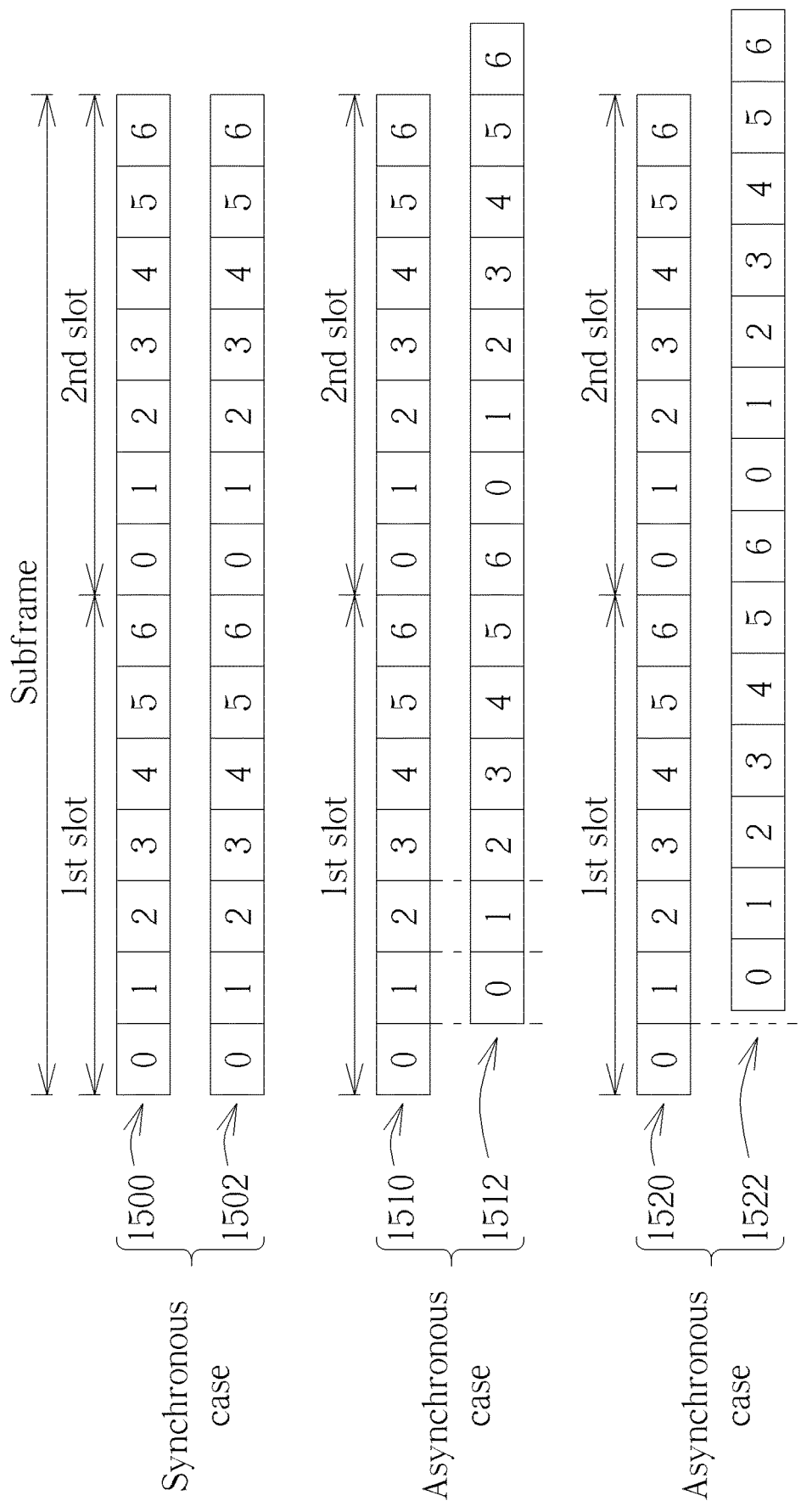
FIG. 15 is a schematic diagram of time differences between a licensed cell and an unlicensed cell according to an example of the present invention.

FIG. 15 is a schematic diagram of time differences between a licensed cell and an unlicensed cell according to an example of the present invention. Examples for one synchronous case and two asynchronous cases are shown in FIG. 15. A subframe including two time slots is considered, and each of the time slots includes 7 OFDM symbols. For the synchronous case, a licensed cell 1500 and an unlicensed cell 1502 are considered. As can be seen, the time difference between the licensed cell 1500 and the unlicensed cell 1502 is nearly zero. That is, the time difference may be much smaller than a duration of an OFDM symbol, e.g., the time difference is at the level of microseconds. Accordingly, the corresponding OFDM symbols of the licensed cell 1500 and the unlicensed cell are determined to be aligned. For the first asynchronous case, a licensed cell 1510 and an unlicensed cell 1512 are considered. As can be seen, the time difference between the licensed cell 1510 and the unlicensed cell 1512 is an OFDM symbol. Note that the time difference in the present case may also be a plurality of OFDM symbols, and is not limited herein. For the second asynchronous case, a licensed cell 1520 and an unlicensed cell 1522 are considered. As can be seen, the time difference between the licensed cell 1520 and the unlicensed cell 1522 is a sum of an OFDM symbol and part of OFDM symbol. Note that the time difference in the present case may also be a sum of a plurality of OFDM symbols and part of OFDM symbol, and is not limited herein.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit(s) and/or mixed circuit(s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a method for solving the reception of service in the unlicensed cell. The present invention also provides a method for solving the transmission of the HARQ feedback for the unlicensed cell. Thus, the resource of the unlicensed cell can be used with the licensed cell to improve throughput of the communication device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for receiving a service in an unlicensed cell, comprising:
   a storage device for storing instructions of:
   receiving information of a resource pool in the unlicensed cell from a network;
   detecting a first starting point of a first service in the resource pool according to the information of the resource pool;
   receiving the first service according to the first starting point, after the first starting point is detected;
   wherein the communication device detects the first starting point by detecting a discovery signal for the first service, and the discovery signal comprises at least one of a common reference signal (CRS), a primary synchronization signal (PSS) and a secondary synchronization signal (SSS); and
   a processing circuit, coupled to the storage device, configured to execute the instructions stored in the storage device.

2. The communication device of claim 1, wherein the resource pool comprises part of a duration of the first service, or comprises the duration of the first service.

3. The communication device of claim 1, wherein the information of the resource pool is received in a licensed cell, is received in a higher layer signaling, or is received in a physical layer signaling.

4. The communication device of claim 1, wherein the information of the resource pool comprise a location of the resource pool.

5. The communication device of claim 1, wherein the instruction of receiving the first service according to the first starting point comprises:
   receiving the first service according to the first starting point and a duration of the first service.

6. The communication device of claim 5, wherein information of the duration of the first service is received from the network, or is predetermined in the communication device.

7. The communication device of claim 1, wherein the discovery signal and the first service are transmitted in a same subframe, or are transmitted in different subframes.

8. The communication device of claim 1, wherein the storage device further stores the instruction of:

stopping detecting any service in the resource pool, if no service is detected in a period of the resource pool.

9. The communication device of claim 1, wherein the storage device further stores the instruction of:
stopping detecting any service in the resource pool, if an indicator in the first service indicates that there is no service in the resource pool.

10. The communication device of claim 1, wherein the first service comprises a licensed assisted access (LAA) service defined in a 3rd Generation Partnership Project (3GPP) standard.

11. A communication device for handling a data detection in an unlicensed cell, comprising;
receiving information of a timing offset in a first subframe of a cell of the network; and
detecting data received in a second subframe of an unlicensed cell of the network according to the first subframe and the timing offset, wherein the first subframe is later than the second subframe; and a processing circuit, coupled to the storage device, configured to execute the instructions stored in the storage device,
wherein the storage device further stores the instruction of: transmitting a hybrid automatic repeat request (HARQ) feedback in response to the data in a third subframe of the cell according to the first subframe.

12. The communication device of claim 11, wherein the cell is a licensed cell, is the unlicensed cell, or is another unlicensed cell.

13. The communication device of claim 11, wherein subframe indices of the first subframe and the second subframe are the same.

14. The communication device of claim 11, wherein the information of the timing offset is transmitted in downlink (DL) control information (DCI) of the first subframe.

15. The communication device of claim 11, wherein the timing offset comprises a number of orthogonal frequency division multiplexing (OFDM) symbols and/or a number of subframes.

16. The communication device of claim 11, wherein the information of the timing offset is represented by at least one bit.

17. The communication device of claim 11, wherein the storage device further stores the instruction of:
receiving an indicator in the first subframe of the cell of the network, wherein the indicator indicates that at least the second subframe is a schedulable subframe.

18. The communication device of claim 17, wherein the indicator comprises a discovery signal.

* * * * *